United States Patent [19]

Sato et al.

[11] Patent Number: 4,940,125
[45] Date of Patent: Jul. 10, 1990

[54] DRIVE MECHANISM IN PART-TIME FOUR-WHEEL DRIVE VEHICLE

[75] Inventors: Kiyoomi Sato, Toyota; Fumihiro Ushijima, Okazaki; Kiyohito Murata, Susono, all of Japan

[73] Assignee: Toyota Jidosha Kabushiki Kaisha, Aichi, Japan

[21] Appl. No.: 301,105

[22] Filed: Jan. 25, 1989

[30] Foreign Application Priority Data

Jan. 25, 1988 [JP] Japan .................. 63-7926[U]

[51] Int. Cl.$^5$ .................. B60K 17/35; F16D 25/14
[52] U.S. Cl. .................. 192/85 AA; 192/103 F; 180/249
[58] Field of Search .................. 192/85 AA, 103 F; 180/233, 247, 249, 250

[56] References Cited

U.S. PATENT DOCUMENTS

| | | | |
|---|---|---|---|
| 2,153,372 | 4/1939 | Hyde | 192/85 AA |
| 3,752,280 | 8/1973 | Cheek | 192/85 AA |
| 3,894,446 | 7/1975 | Snoy et al. | 192/103 F X |
| 4,012,968 | 3/1977 | Kelbel | 192/85 AA X |
| 4,445,400 | 5/1984 | Sullivan et al. | 192/85 AA X |
| 4,727,966 | 3/1988 | Hiramatsu et al. | 192/85 AA X |
| 4,821,604 | 4/1989 | Asano | 192/103 F X |

FOREIGN PATENT DOCUMENTS

| | | | |
|---|---|---|---|
| 228697 | 7/1987 | European Pat. Off. | 192/85 AA |
| 62-251236 | 11/1987 | Japan | 180/247 |
| 63-67431 | 3/1988 | Japan | 192/85 AA |
| 63-291729 | 11/1988 | Japan | 180/247 |

Primary Examiner—Richard Lorence
Attorney, Agent, or Firm—Oliff & Berridge

[57] ABSTRACT

A drive mechanism of the limited slip type having driving and driven members to be drivingly connected, wherein a friction clutch is operatively associated with the driving and driven members to drivingly connect the members in its engaged condition, and a fluid pump is arranged between the driving and driven members to be driven by relative rotation therebetween and located adjacent one side of the clutch, the fluid pump being movable in a direction to effect engagement of the clutch when applied at one side thereof with a discharge pressure thereof, and wherein a communication passage for fluid circulation is connected at one end thereof to a discharge port of the pump and at the other end thereof to a suction port of the pump, and a flow control valve is disposed in the communication passage to control an amount of fluid under pressure passing through the communication passage.

3 Claims, 2 Drawing Sheets

DRIVE MECHANISM IN PART-TIME FOUR-WHEEL DRIVE VEHICLE

BACKGROUND OF THE INVENTION

The present invention relates to a drive mechanism including driving and driven members to be drivingly connected for providing a four-wheel drive mode in a part-time four-wheel drive vehicle, and more particularly to a drive mechanism of the limited slip type wherein a friction clutch means is actuated to drivingly connect the driving and driven members in response to relative rotation therebetween.

SUMMARY OF THE INVENTION

A primary object of the present invention is to provide an improved drive mechanism wherein a fluid pump is arranged to be applied with a discharge pressure thereof under control of a simple valve mechanism and to effect a frictional engagement of the clutch means when moved by the discharge pressure.

According to the present invention, the primary object is attained by the provision of a drive mechanism having rotatable driving and driven members, friction clutch means operatively associated with the driving and driven members and operable between a first condition wherein the driving and driven members are drivingly connected and second condition wherein relative rotation between the driving and driven members is permitted, the clutch means including friction members cooperating with driving and driven members and arranged to be engaged when clutch means is in the first condition, actuating means in the form of a fluid pump arranged between the driving and driven members to be driven by relative rotation therebetween, the fluid pump being located adjacent one side of the clutch means and movable in a direction to effect a frictional pressure engagement of the friction members when applied at one side thereof with a discharge pressure thereof, wherein a communication passage for fluid circulation is connected at one end thereof to a discharge port of the pump and at the other end thereof to a suction port of the pump, a flow control valve is disposed in the communication passage to control an amount of fluid under pressure passing through the communication passage, and a control device is provided to activate the flow control valve.

Preferably, the flow control valve includes an axially displaceable valve element disposed in the communication passage and shiftable between a first position in which it is retained to open the communication passage and a second position in which it is retained to restrict or close the communication passage for throttling or interrupting the flow of fluid under pressure from the discharge port of the pump, and the control device is in the form of a shift mechanism adapted to shift the valve element to and from the second position. It is further preferable that the valve element of the control valve is arranged adjacent the discharge port of the pump.

BRIEF DESCRIPTION OF THE DRAWINGS

Other objects, features and advantages of the present invention will be readily appreciated from the following detailed description of a preferred embodiment thereof when considered with reference to the accompanying drawings, in which.

DESCRIPTION OF THE PREFERRED EMBODIMENT

Figure 3:
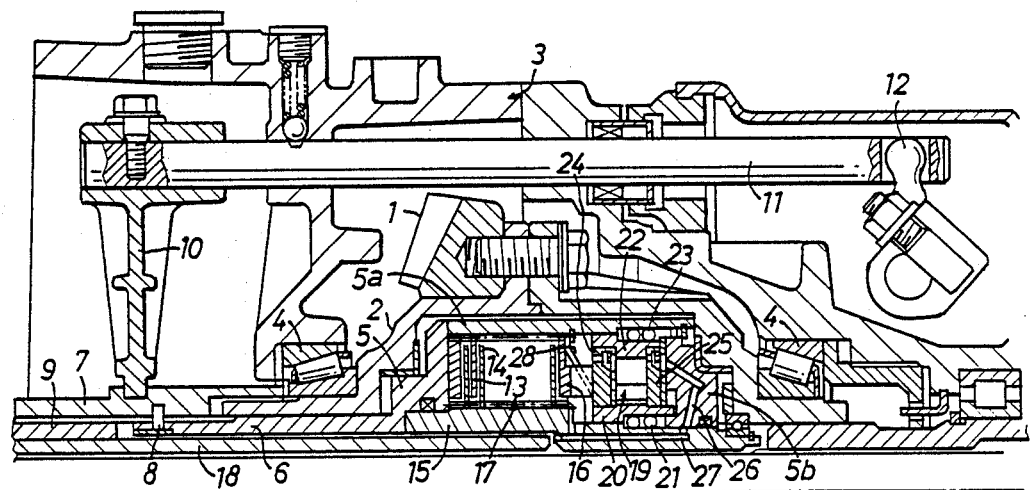
FIG. 3 is an axial sectional view of a prior art drive mechanism proposed by the inventors.

Referring now to the attached drawings, a preferred embodiment of the present invention will be described in comparison with a conventional embodiment. For a better comparison, disclosed in FIG. 3 is a prior art drive mechanism proposed by the inventors, which drive mechanism includes a ring gear 1 for transmitting a drive torque to traction road wheels (not shown), an internal carrier casing 2 provided thereon with the ring gear 1 and rotatably mounted within a transfer housing 3 by means of a pair of axially spaced bearings 4, and a driven member in the form of an internal case 5 integral with a tubular extension shaft 6 axially movably coupled within the carrier casing 2. The tubular extension shaft 6 of internal case 5 is splined at its left end to an axially slidable sleeve member 7 and fixed to the same by means of a pin 8 for rotation therewith. The sleeve member 7 has one end splined to the left-hand portion of carrier casing 2 and the other end splined to a tubular shaft 9 which is arranged in surrounding relationship with a driving member in the form of an internal tubular shaft 18. A shift fork 10 is engaged with and external groove of sleeve member 7 at its yoke and mounted on a slide rod 11 at its base for axial movement therewith. The slide rod 11 is axially slidably mounted on transfer housing 3 and operatively connected at its right-hand end to a pneumatic actuator (not shown) through a link mechanism 12 to be translated.

The drive mechanism further includes a cylindrical member 15 splined to the internal tubular shaft 18 for rotation therewith and coupled with the internal case 5 relative rotation thereto, and a friction clutch 17 of the multi-disc type disposed between a cylindrical portion 5a of internal case 5 and the cylindrical member 15. The friction clutch 7 has a first set of friction discs 13 splined to the cylindrical portion 5a of internal case 5 and a second set of friction disc 14 splined to the cylindrical member 15 and interleaved with friction discs 13. An annular thrust member 16 is arranged to effect a frictional pressure engagement of friction discs 13, 14 when applied with a thrust force. The drive mechanism further includes a fluid pump 19 of the vane type located adjacent one side of the friction clutch 17 and disposed between the cylindrical portion 5a of internal case 5 and an extended portion of cylindrical member 15 to discharge fluid under pressure therefrom in response to relative rotation between the internal case 5 and cylindrical member 15. The fluid pump 19 comprises a rotor 20 provided thereon with a plurality of circumferentially spaced vanes and mounted on the extended portion of cylindrical member 15 through ball splines 21, a cam ring 22 mounted to the cylindrical portion 5a of internal case 5 through ball splines 23 for rotation therewith, and a pair of axially spaced end plates 24, 25 coupled with the opposite ends of cam ring 22 to contain the rotor 20 therein. The left-hand end plate 24 is provided with a suction port and engaged with the thrust plate 16, while the right-hand end plate 25 is provided with a discharge port. Thus, the fluid pump assembly 17 is axially movable in a direction to apply the thrust force to the thrust plate 16.

To permit the flow of fluid under pressure from the discharge port of end plate 25 into the suction port of end plate 24, a first fluid passage 26 is formed in a closure member 5b which is secured to the right end of cylindrical portion 5a of internal case 5 and axially slidably coupled with the extended portion of cylindrical member 15 for relative rotation, and a second fluid passage 27 is formed in the extended portion of cylindrical member 15. The first passage 26 has one end in open communication with the discharge port of end plate 25 and the other end to be communicated with one end of second fluid passage 27. The other end of second fluid passage 27, is in open communication with the suction port of end plate 24. In addition, a return spring 28 is disposed between the thrust plate 16 and end plate 24.

Figure 5:
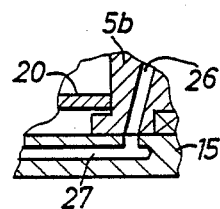
FIG. 4 and 5 each are an enlarged fragmentary sectional view of a portion of the mechanism shown in FIG. 3.
Figure 4:
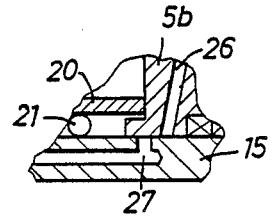

Assuming that the sleeve member 7 is retained in a first position where the internal case 5 is positioned in a rightward stroke end as shown in FIG. 3, the first fluid passage 26 is disconnected from the right end of second fluid passage 27 as shown in FIG. 4. In such a condition, the fluid pump 19 is operated to discharge fluid under pressure therefrom in response to relative rotative between the cylindrical member 15 and internal case 5. The discharge fluid under pressure is blocked by the extended portion of cylindrical member 15 to increase the pressure in a space between the end plate 25 and closure member 5b. As result, the fluid pump assembly 17 is urged by the discharge pressure to apply a thrust force to the thrust plate 16, and in turn, the friction discs 13, 14 of clutch 17 are engaged to transfer a driving power from the driving member 18 to the ring gear 1 via the clutch 17, internal case 5, sleeve member 7 and carrier casing 2. Assuming that the sleeve member 7 is shifted to and retained in a second position where the internal case 5 is positioned in a leftward stroke end, the first fluid passage 16 is communicated with the right end of second fluid passage 27 as shown in FIG. 5. In such a condition, the fluid under pressure discharged from fluid pump 19 is circulated into the suction port of pump 19 through the first and second fluid passage 26 and 27 to maintain the friction clutch 17 in a disengaged condition.

From the above description, it will be understood that in shifting operation of the sleeve member 7 to and from the second position, the internal case 5 and the associated parts thereof are shifted against a sliding resistance at the spline connections of sleeve member 7 with the carrier casing 2 and tubular shaft 9. In such an arrangement, it is required to apply a great force to the slide rod 11 in shifting operation of the sleeve member 7. For this reason, the pneumatic actuator for shifting the slide rod 11 has to be constructed large in size, resulting in deterioration of response in shifting operation of the sleeve member 7.

Figure 1:
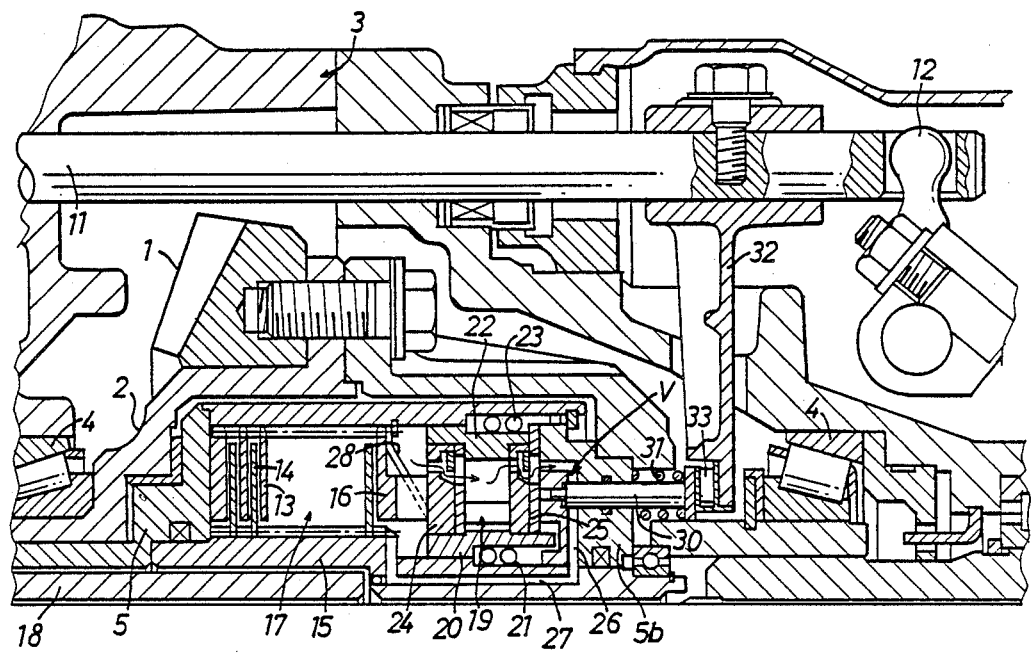
FIG. 1 is an axial sectional view of a drive mechanism in accordance with the present invention.
Figure 2:
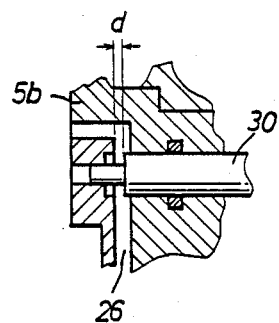
FIG. 2 is an enlarged fragmentary sectional view of a portion of the mechanism shown in FIG. 1.

FIGS. 1 and 2 are referred to for an improved drive mechanism of the present invention and disclosed hereinafter are the construction and operation of the mechanism. In FIGS. 1 and 2, the same or similar reference numerals as those in FIG. 3 are used for the same or similar component parts or portions of the prior art drive mechanism. Now particularly referring to FIG. 1, the drive mechanism of the present invention is characterized in that the internal case 5 is fixedly coupled with the carrier casing 2 for rotation therewith and that the first fluid passage 26 is constantly communicated with the second fluid passage 27 to provide a fluid circulation between the discharge and suction ports of fluid pump 19. A flow control valve V is provided to control an amount of fluid under pressure passing through the first fluid passage 26. The flow control valve V includes an axially displaceable valve element 30 which is mounted in the closure member 5b and has an inner end portion disposed in the first fluid passage 26. The valve element 30 extends outwardly from the carrier casing 2 in a fluid-tight manner and is loaded outwardly by means of a compression coil spring 31 received at its outer end. When the control valve V is in a condition as shown in FIG. 2, an inner end face of valve element 30 is separated from the inner wall of passage 26 in a distance $d$ to fully permit the flow of fluid under pressure passing through the passage 26. When the valve element 30 of control valve V is axially inwardly displaced against the load of spring 31, the flow of fluid from the discharge port of pump 19 is throttled in accordance with inward displacement of valve element 30 to increase a discharge pressure acting on the fluid pump 19. A shift fork 32 is fixedly mounted on the slide rod 11 at its base for axial movement therewith and receives the outer end of valve element 30 through a needle bearing 33 to effect the inward displacement of valve element 30 in its shifting operation.

Assuming that the fliud pump 19 is being operated by relative rotation between the cylindrical member 15 and internal case 5 in a condition where the valve element 30 is in the outwardly retracted position, fluid under pressure discharged from the fluid pump 19 circulates into the suction port of pump 19 through the passage 26 and 27. In such a condition, the fluid pump 19 is retained in position to maintain the friction clutch 17 in a disengaged condition. When the shift fork 32 is shifted to displace the valve element 30 axially inwardly, the discharge pressure of pump 19 increases in accordance with the inward displacement of valve element 30, and in turn, the fluid pump 19 is urged leftwards by the discharge pressure applied thereto to apply a thrust force to the thrust plate 16. Thus, the friction discs 13, 14 of clutch 17 are engaged to transfer a driving power from the driving member 18 to the ring gear 1 via the clutch 17, internal case 5 and carrier casing 2. In this instance, the engagement force of clutch discs 13, 14 will increase in accordance with the inward displacement of valve element 30. When the valve element 30 is displaced to its innermost stroke end to fully close the fluid passage 26, the discharge pressure of fluid pump 19 becomes a maximum value, and the friction discs 13, 14 of clutch 17 are to be maintained in an engaged fully engaged condition.

From the above description, it will be understood that in shifting operation of the shift fork 32 only the valve element 30 is axially inwardly displaced to effect a frictional pressure engagement of clutch discs 13, 14. With such an arrangement, the valve element 30 can be smoothly displaced by a small force applied to the slide rod 11. It is, therefore, apparent that a pneumatic actuator of small capacity can be adapted to the shift mechanism to effect quick response in shifting operating of the valve element 30.

The preferred embodiment of the invention has been disclosed for illustrated purposes. Many variations and modifications of the preferred embodiment are believed to be within the spirit of the invention. For example, the valve element may be electrically operated to control an amount of fluid under pressure passing through the passage 26 and 27. The following claim are intended to cover the inventive portions of the preferred embodiment and modifications believed to be within the spirit of the invention.

What is claimed is:

1. A drive mechanism comprising driving and driven members coaxially coupled with each other for relative rotation, friction clutch means operatively associated with said driving and driven members and operable between a first condition wherein said driving and driven members are drivingly connected and a second condition wherein relative rotation between said driving and driven members is permitted, said clutch means including friction members cooperating with said driving and driven members and arranged to be engaged when said clutch means is in the first condition, a fluid pump arranged between said driving and driven members to be driven by relative rotation therebetween, said fluid pump being located adjacent one side of said clucth means and axially movable in a direction to effect a frictional pressure engagement of said friction members when applied at one side thereof with a discharge pressure thereof, and a flow control valve disposed in a communication passage for fluid circulation between discharge and suction ports of said fluid pump to control an amount of fluid under pressure passing therethrough from the discharge port toward the suction port;

wherein said flow control valve includes an axially displaceable valve element disposed in said communication passage and shiftable between a first position in which it is retained to fully open said communication passage and and second position in which it is retained to close said communication passage for interrupting the flow of fluid under pressure from the discharger port of said pump, and wherein a shift mechanism is adapted to shift said valve element to and from the second position.

2. A drive mechanism as claimed in claim 1, wherein said valve element is arranged to restrict said communication passage in its seconds position for throttling the flow of fluid under pressure from the discharge port of said pump.

3. A drive mechanism as claimed in claim 1, wherein said valve element is arranged adjacent the discharge port of said pump.

* * * * *